United States Patent
McTaggart

(10) Patent No.: US 7,696,995 B2
(45) Date of Patent: Apr. 13, 2010

(54) SYSTEM AND METHOD FOR DISPLAYING THE EFFECTS OF LIGHT ILLUMINATION ON A SURFACE

(75) Inventor: Gary M McTaggart, Redmond, WA (US)

(73) Assignee: Valve Corporation, Bellevue, WA (US)

( * ) Notice: Subject to any disclaimer, the term of this patent is extended or adjusted under 35 U.S.C. 154(b) by 211 days.

(21) Appl. No.: 10/840,939

(22) Filed: May 7, 2004

(65) Prior Publication Data

US 2005/0248571 A1    Nov. 10, 2005

(51) Int. Cl.
*G06T 15/50* (2006.01)
(52) U.S. Cl. ..................... 345/426; 345/428
(58) Field of Classification Search .............. 345/584, 345/426
See application file for complete search history.

(56) References Cited

U.S. PATENT DOCUMENTS

| | | | |
|---|---|---|---|
| 5,222,203 A | | 6/1993 | Obata |
| 5,710,876 A | * | 1/1998 | Peercy et al. ............... 345/426 |
| 5,757,321 A | * | 5/1998 | Billyard .................... 345/426 |
| 5,880,736 A | * | 3/1999 | Peercy et al. ............... 345/426 |
| 5,905,503 A | * | 5/1999 | Penna ....................... 345/426 |
| 6,414,684 B1 | * | 7/2002 | Mochizuki et al. ........... 345/473 |
| 6,628,298 B1 | | 9/2003 | Debevec |
| 6,659,861 B1 | | 12/2003 | Faris et al. |
| 6,700,585 B2 | * | 3/2004 | Ritter ...................... 345/582 |
| 6,922,193 B2 | * | 7/2005 | Ritter ...................... 345/426 |
| 6,999,083 B2 | * | 2/2006 | Wong et al. ................ 345/473 |
| 7,006,090 B2 | * | 2/2006 | Mittring ................... 345/426 |
| 7,075,530 B2 | | 7/2006 | D'Amora |
| 7,091,973 B1 | | 8/2006 | Cohen |
| 7,227,548 B2 | | 6/2007 | Birdwell |
| 7,508,391 B2 | | 3/2009 | Birdwell |
| 2003/0093466 A1 | | 5/2003 | Jarman et al. |

OTHER PUBLICATIONS

Marco Tarini, Paolo Cignoni, Claudio Rocchini and Roberto Scopigno, "Real time, Accurate, Multi-Featured Rendering of Bump Mapped Surfaces," 2000, Computer Graphics Forum (Eurographics 2000 Conference Proc.), vol. 19, No. 3, p. 119-130.*

(Continued)

*Primary Examiner*—Jason M Repko
(74) *Attorney, Agent, or Firm*—Darby & Darby P.C.; John W. Branch

(57) ABSTRACT

A system and method are directed to determining light illumination in a graphical environment. One or more light sources are illuminating a surface. The surface is divided into one or more cells. The orientation of each cell is determined and saved in an orientation field. A multidimensional light map value is derived and associated with the surface. The multidimensional light map value defines the combined illumination of the one or more light sources on the surface, and may optionally be a vector. At least one cell to be drawn is determined. For each cell to be drawn, an illumination value associated with that cell to be drawn is determined. The illumination value is based on the orientation field and the multidimensional light map value. The illumination value may be the dot product of the orientation field and the multidimensional light map value.

30 Claims, 9 Drawing Sheets

OTHER PUBLICATIONS

Weik, Martin H., "Communications Standard Dictionary," 1996, p. 169, Springer.

"Normal Mapping", Wikipedia, the free encyclopedia, http://en.wikipedia.org/wiki/Normal_map, Jan. 23, 2008.

Pascale, D.; A Review of RGB Color Spaces . . . from xyY to R'G'B'; Document; 2002-2003 (printed from web Jun. 2008); 35 pages; The BabelColor Company; Montreal, Canada.

Dimension3, "Project6—Lighting." Dimension3 Web Site, www.dimension3.host.sk/web/project.php?pid=Project6&page=4&PFriend=1, accessed Apr. 30, 2004 (33 pages).

Manituk et al., "Cube-Map Data Structure for Interactive Global Illumination Computation in Dynamic Diffuse Environments," Sep. 2002, International Conference on Computer Vision and Graphics 2002, pp. 1-7.

McTaggart, G., "Half-Life © 2/Valve Source™ Shading," Mar. 2004, Valve Corporation, pp. 1-3, 6-12, 18, 57-61, 83-86.

Pattanaik et al., "Real Time Realistic Rendering," Dec. 2002, 23rd Army Science Conference 2002, pp. 1-2.

* cited by examiner

SYSTEM AND METHOD FOR DISPLAYING THE EFFECTS OF LIGHT ILLUMINATION ON A SURFACE

FIELD OF THE INVENTION

This application relates generally to computer graphics and specifically to determining and displaying light illumination effects on a surface.

BACKGROUND OF THE INVENTION

It has long been the goal of the computer arts to create compelling visual images through computer graphics. While these visual images may represent real or imaginary things, they still require that certain aspects be presented with high realism. This requirement is especially true for optics. Humans rely on light to perceive the world around them. Variations in light due to various optical interactions are decoded by our brains into information about the nature, position shape and relationship between objects in the world. For this reason, any representation in computer graphics whether realistic or fantastic requires a certain amount of optical realism in order to be properly evaluated by the human brain.

Since we live in and perceive a three dimensional world, three dimensional computer graphics are usually more compelling. Three dimensional images may be simulated on a two dimensional screen by using various "tricks" known in the visual arts. In addition, "true" three dimensional images may also be displayed by providing two slightly different images to the viewer's eyes. Regardless of how the third dimension is realized, accurate and realistic optical effects are desirable for creating three-dimensional images.

It has also been the goal of the computer arts to create dynamic or real time computer generated graphics. That is, to create images that change in real time, preferably as a result of user input. Such graphics can be used in a variety of applications, such as, computer games, flight simulators, driving simulators, and the related training applications, virtual reality software, etc. Dynamic graphics usually require that a computer calculate the nature and positions of various objects and determine how to graphically represent these objects in real time. As a result, dynamic graphics require a considerable amount of processing power. In order to alleviate this need, preprocessing is often used.

Preprocessing refers to performing various processing actions for creating an image, at a time prior to the time when the image is to be created and when more processing resources are available. However, not all processing actions for creating an image may be performed at the preprocessing stage. In dynamic environments, some information about the placement of objects or the lighting may not be known until the time when the image is to be created. Therefore, the actions to be performed during preprocessing should be carefully selected as to use the limited information available at this stage in order to ease the processing requirements when the image is being drawn.

One known way of creating dynamic three dimensional graphics is the use of polygons. Three dimensional shapes are represented by one or more polygons. There are existing software packages that draw and manipulate predefined polygons. The performance of these packages is usually related to the number of polygons that are to be drawn. Shapes that have a high surface detail present a significant difficulty, as they may require a large number of polygons.

A known way to deal with this problem is to use a two dimensional picture that approximates the three dimensional qualities of the object. Thus, for example, a brick on a wall, may be represented by a two dimensional picture of a brick. While a brick does have three dimensional aspects, especially around the edges, these may not be kept track of by the computer. Instead, the two dimensional picture is drawn in such a way that it shows the three dimensional aspects. This method is especially useful when many identical elements are present. Such is the case, for example, when several hundred identical bricks are to be drawn on a wall.

However, a two dimensional picture does not always provide a good representation of the three dimensional brick. Three dimensional objects look different when viewed from different angles, and these differences cannot be represented by a single unchanging two dimensional picture. Furthermore, light reflects differently from a surface depending upon the surface's angle in relation to the angle of illumination. This information cannot be encoded in a fixed predefined two dimensional picture, because the angle of illumination is not usually known at the time the picture is created. This is especially true for light sources which are positioned dynamically, i.e., while a computer graphics application is running.

Environments that include a plurality of light sources are especially difficult to simulate in computer graphics. This difficulty is magnified if the simulation must be done in real-time. That is the case because the combined effect of multiple light sources on particular surface depends on many factors, including the location of the surface, the orientation of the surface, and the location and intensity of each light source. Furthermore, these relationships cannot be easily simplified. For example, it is difficult to combine the effects of the multiple light sources into a single representative light source, which can be used for all surfaces, because the combined effects of multiple light sources differ greatly depending on the spatial relationship between the surface and the light sources.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENTS

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Some of the difficulties of displaying three dimensional objects described above are addressed by normal maps. Normal maps are designed to encode three-dimensional information about an object without the use of polygons in a virtual environment, such as a video game, chat room, virtual world, machinima, and the like. A normal map is most effective when used with an object that has the proximate shape of a cuboid (or a rectangular prism) but has an uneven surface at one or more of its faces. A normal map can store the different surface variations of these faces in high detail. Therefore, normal maps are usually effective when used with bricks or tiles that have a relief pattern on one or more of their sides.

Figure 1:
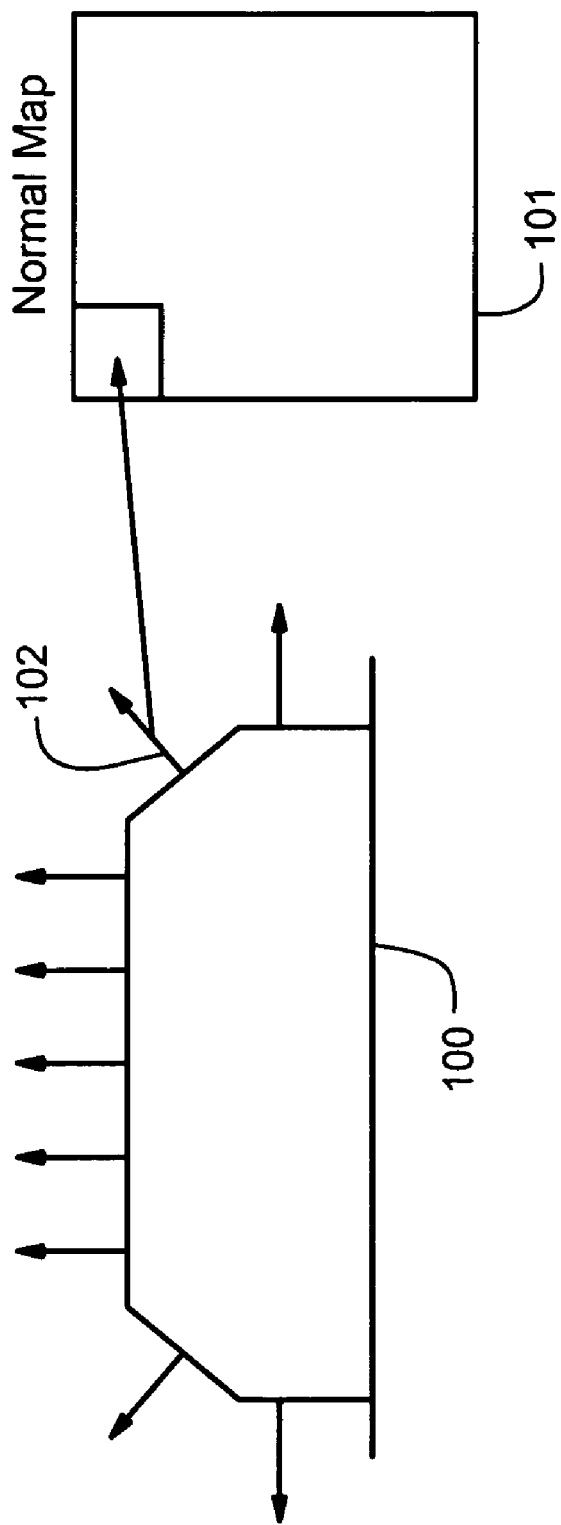
FIG. 1 is a diagram showing one embodiment of a use of a normal map to encode a three dimensional object.

FIG. 1 shows the use of a normal map to encode the surface of a tile (100). A two dimensional cutout of the tile is shown; the tile, however, is three dimensional. The surface of the tile is divided into a plurality of cells. Each cell represents the smallest unit of surface area for which information is stored. The density of the cells depends on the desired accuracy. For high accuracy, each cell can represent a pixel which is the smallest "dot" that can be displayed at a given resolution. However, when a lower accuracy is selected, or when the surface detail is relatively low, a cell may represent more than one pixel.

For each cell, a surface orientation of the cell is determined. If a cell does not represent a flat surface, then a representative surface orientation may be taken, by determining the average surface orientation, or sampling the surface orientation at a single point, such as the center of the cell, and the like. The surface orientation is then stored in array 101. There are several ways to define a surface orientation. One way, as shown in FIG. 1, is the use of a unit vector which is normal to the surface of the cell. Persons skilled in the art are aware of methods that can be used to store unit vectors in computer memory. When these unit vectors are used, array 101 is referred to as a normal map. There are other methods of defining a surface orientation, such as, for example, defining two lines belonging to the surface, defining three points belonging to the surface and not belonging to a single line, providing two angular displacement values from a reference surface. A person skilled in the art will recognize that all these methods as well as others can be used with the present invention. Therefore, while the continuing disclosure refers to array 101 as a normal map and its elements as normal vectors, it is noted that the array and its elements may be of different nature, in light of the other possible ways of storing surface orientation data. In fact, it may not be an array at all, but another data structure.

Thus, normal map 101 defines the surface orientations of the cells of object 100. The normal map may be used for other objects having an identical surface, such as a plurality of bricks or tiles. Also several normal maps may be used to display a single object, each normal map representing one or more portions of the object. A normal area is referred to as the area of the surface of an object which is entirely represented by a single normal map.

The surface orientation values may be used to display the object 100 in a manner that is more realistic than the sole use of a two dimensional picture. Furthermore, these values may be used to determine accurate light illumination values and use them to further improve the appearance of the object.

The way humans perceive objects depends greatly on the light illuminating the objects. Light hitting a surface is reflected and scattered in various directions. This reflected and scattered light is what allows us to see the object. Thus, the intensity of this scattered and reflected light is a significant factor in the appearance of the object. The intensity, of course, depends on the intensity of the illuminating light. But it also depends on the angle of the illuminating light in relation to the surface. Light at oblique angles is not as intensely reflected as light from angles of or close to 90 degrees.

When rendering a surface in computer graphics, the angle (in relation to the surface) of the illumination ray as well as its intensity can be determined. This way, a relatively accurate illumination value may be discerned. This process becomes more complex as more light sources are added. While, it can be assumed that illuminations from different light sources aggregate, making calculations for each light source and adding the results, may prove too processor intensive, especially if this procedure is performed for each small surface in real-time.

Figure 2:
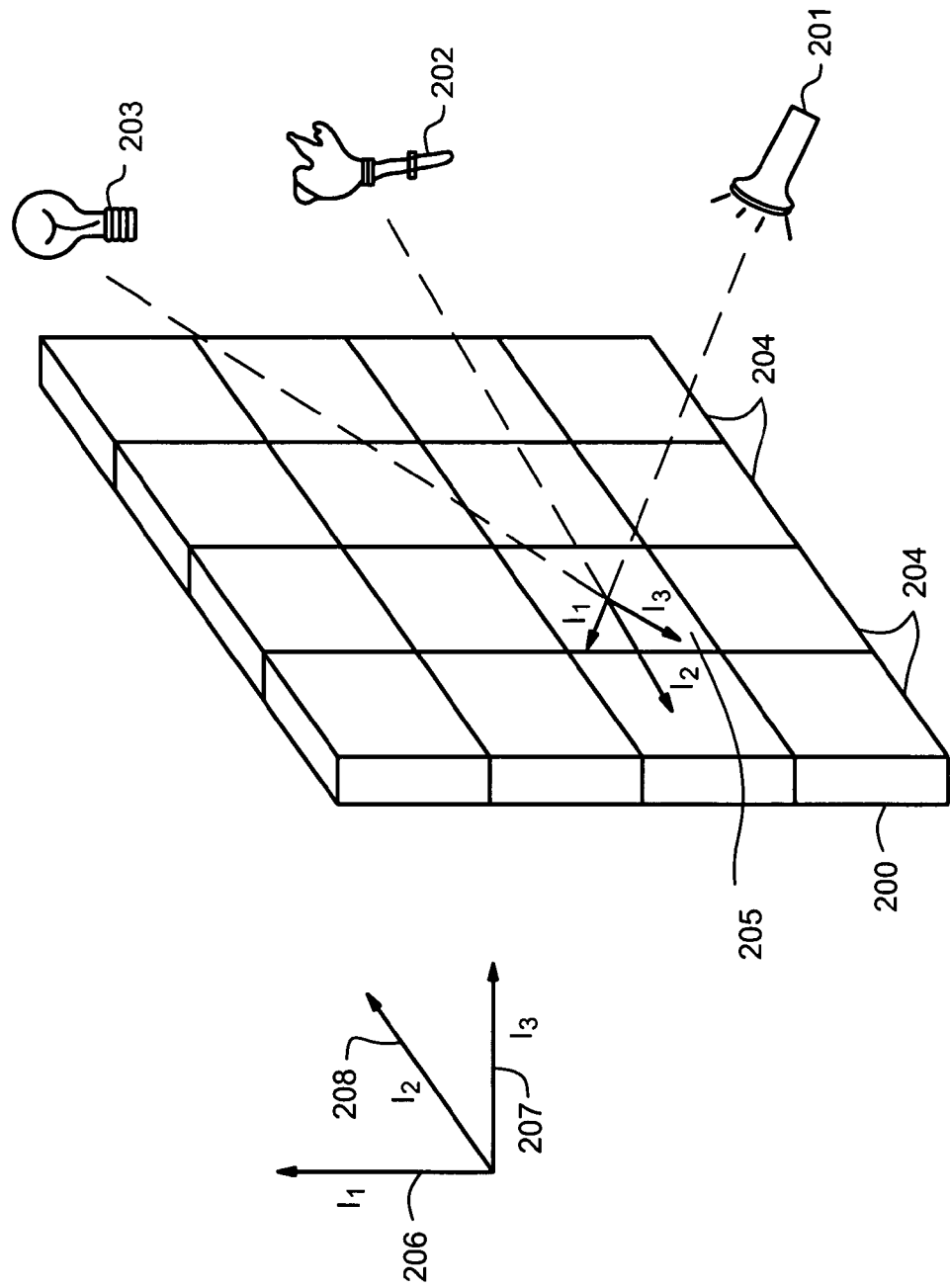
FIG. 2 is a diagram showing one embodiment of sampling of an illumination effect of several light sources on an object.

Described below is a manner of performing the above process with an increased efficiency. FIG. 2 shows several light sources 201, 202 and 203 illuminating an object. The object is a wall (200) but it may be any other object. Unless otherwise stated, the following disclosure concerns the graphical representation of a three dimensional environment, as shown in FIG. 2. However, the present invention may also be used in conjunction with a different number of dimensions.

The object is divided into several light map areas 204. The size of the light map areas is a significant factor in the quality and efficiency of calculations. The size can be chosen in light of the expected distance between light map areas 205 and illumination elements 201, 202, 203. Specifically, the size can be chosen so the angle of illumination from a single light source does not differ greatly between various points belonging to a light map area. In other words, the largest dimension of the light map area are typically small compared to the distance between the light map area 204 and each light source 201, 202, 203. A smaller light map area results in greater and more accurate detail, as well as higher processing requirements. Thus, the processing and quality requirements typically are taken into account when determining the size of the light map area.

The size of the light map area may be predefined, determined by preprocessing or determined in real time. While, the latter options may require progressively higher processing power, they may result in a more accurate determination of the size of the light map area, as the virtual distances between various surfaces and illumination sources become resolved. Furthermore, different objects may have different light map areas.

Normal map(s) (or their equivalents) is/are available for the object (wall 200). Wall 200 may comprise one or more normal areas, represented by one or more normal maps. The relationships between the various light map areas and the normal areas is significant. Specifically, each cell of a normal area corresponds to at least one light map area. Thus, normal areas may be smaller or larger than light map areas, as long as the light map areas "cover" the normal areas. For clarity, the following discussion refers to the case in which the light map and normal areas are identical in size and placement, unless otherwise stated. In general, the light map area encompasses a plurality of cells so that certain efficiency gains of the present invention may be realized. Various light map areas as well as normal areas, typically are uniquely identified, such as by the use of coordinates as shown in FIG. 2.

For reference purposes, several basis directions are defined. This is preferably done by the use of basis vectors $b_1$, $b_2$, and $b_3$ (206, 207, and 208, respectively). In the three dimensional embodiment, three basis directions are used. The three basis directions span a three dimensional space. That is, the basis directions do not belong to a single plane. For example, the basis vectors may be unit vectors perpendicular to each other. In addition, for efficiency purposes, the basis directions may be generally aligned with predominant features of the graphical environment to be displayed, such as floors, corridors, walls, land, etc. Alternatively, the basis directions may align with the coordinates used by the computer system to define the three dimensional space.

For each individual light map area the illumination effects of each light source on that light map area are determined. However, this may not be done for light map areas that are not illuminated or are not to be rendered (because they may be obstructed by another object, for example). Illumination vectors are determined for each light source in connection to a particular light map area. For example, for light map area 205, illumination vectors $l_1$, $l_2$, and $l_3$ (corresponding to light sources 203, 202, and 201 respectively) are determined. Each illumination vector has a magnitude corresponding to the intensity of illumination and direction corresponding to the direction of illumination. The direction of illumination is usually determined by drawing a straight line from the light source to the light map area. The intensity is determined by the intensity of the light source (which is known), as optionally modified to reflect decrease of intensity based on the distance between the light source and the light map area and a predefined air transparency value.

The illumination vectors are used to create a multi dimensional illumination value. In the three dimensional embodiment, the value is three dimensional. The three dimensional illumination value comprises three single dimensional (i.e., real number) values each representing the total light intensity contribution of all the light sources in a single basis direction. These values are referred to as light map values and may be derived by various well known mathematical actions. For example, one may add the three illumination vectors and take the dot product of the resulting vector with each basis vector. Another option is to break up each illumination vector into partial directional illumination values ($p_{1-3}$), which correspond to the projection of the illumination vector in each basis direction. This may be done by taking the dot products of the illumination vector with each basis direction. Thus for the illumination vector $l_1$:

$$p_{l(1),b(1)} = l_1 \cdot b_1;$$

$$p_{l(1),b(2)} = l_1 \cdot b_2; \text{ and}$$

$$p_{l(1),b(3)} = l_1 \cdot b_3.$$

It can be seen that a partial directional illumination value is created for each basis direction $b_{1-3}$. These actions are repeated for the other illumination vectors ($l_2$ and $l_3$). Then, the partial directional illumination values which correspond to a single basis direction are added to arrive to the light map value for that basis direction. Thus if the light map values are referred to as $lm_{1-3}$, they can be expressed as:

$$lm_1 = p_{l(1),b(1)} + p_{l(2),b(1)} + p_{l(3),b(1)} = l_1 \cdot b_1 + l_2 \cdot b_1 + l_3 \cdot b_1;$$

$$lm_2 = p_{l(1),b(2)} + p_{l(2),b(2)} + p_{l(3),b(2)} = l_1 \cdot b_2 + l_2 \cdot b_2 + l_3 \cdot b_2; \text{ and}$$

$$lm_3 = p_{l(1),b(3)} + p_{l(2),b(3)} + p_{l(3),b(3)} = l_1 \cdot b_3 + l_2 \cdot b_3 + l_3 \cdot b_3.$$

As discussed above, the three dimensional light map value (LM) includes all the light map values for a certain light map area. Thus for light map area 205, the three dimensional light map value is:

$$LM_{205} = \langle lm_1, lm_2, lm_3 \rangle$$

Figure 3:
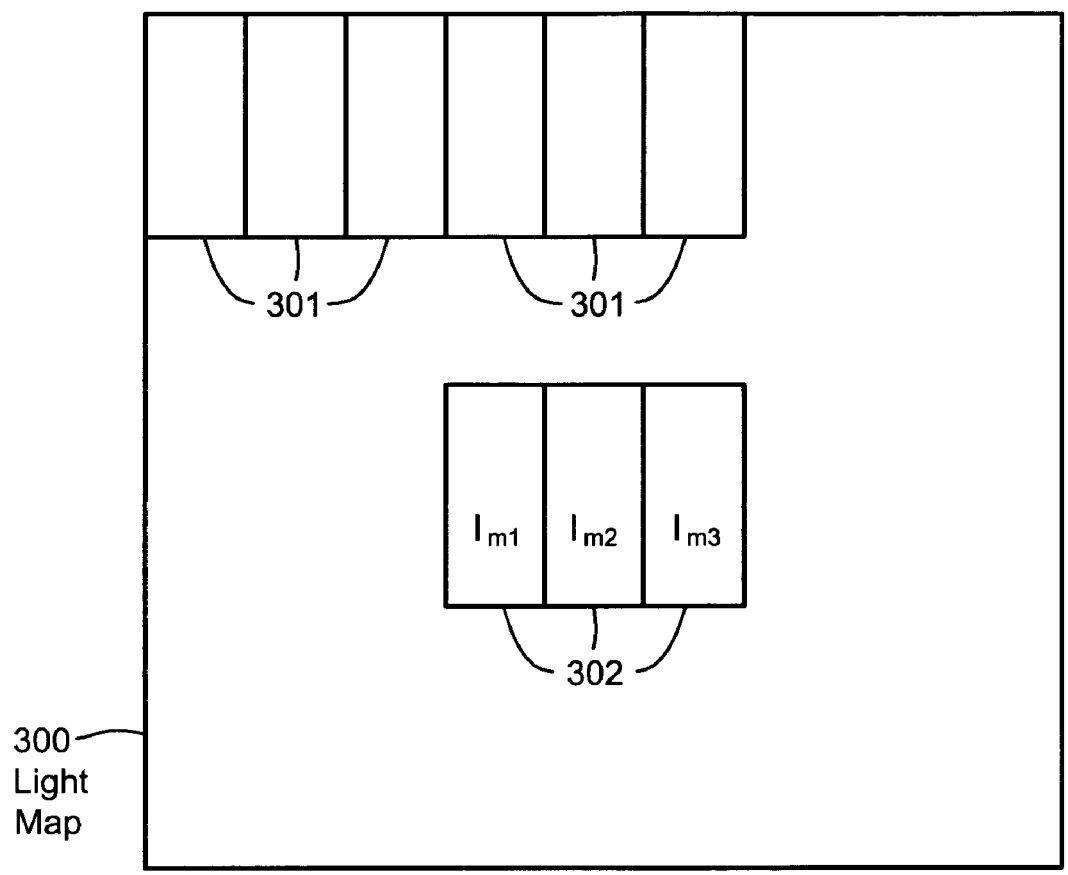
FIG. 3 is a diagram showing one embodiment of a light map.

The three dimensional light map values are stored in a light map data structure (light map) as shown in FIG. 3. Light map 300 stores light map values 301 for a plurality of light map areas. Light map values 302 for area 205 are present and together form a three dimensional light map value for that area.

Alternatively, a light map vector may be created instead of the multidimensional light map value. The light map vector is created by simply adding all the illumination vectors. The light map vector is similarly stored in the light map.

A single light map may be used for all light map areas that are to be rendered. Alternatively, different light maps may be used for the light map areas of different objects. Optionally, additional data may be stored in the light map. For example, gamma correction information may be stored for each light map area.

The processing related to calculating the various light map data may be done during the preprocessing stage. This may be done when approximate positions of the significant light sources are known at that stage, i.e. the lights are statically positioned. Alternatively, these calculations may be done during the real time stage. This would enable better visualization of variable or mobile light sources.

Figure 4:
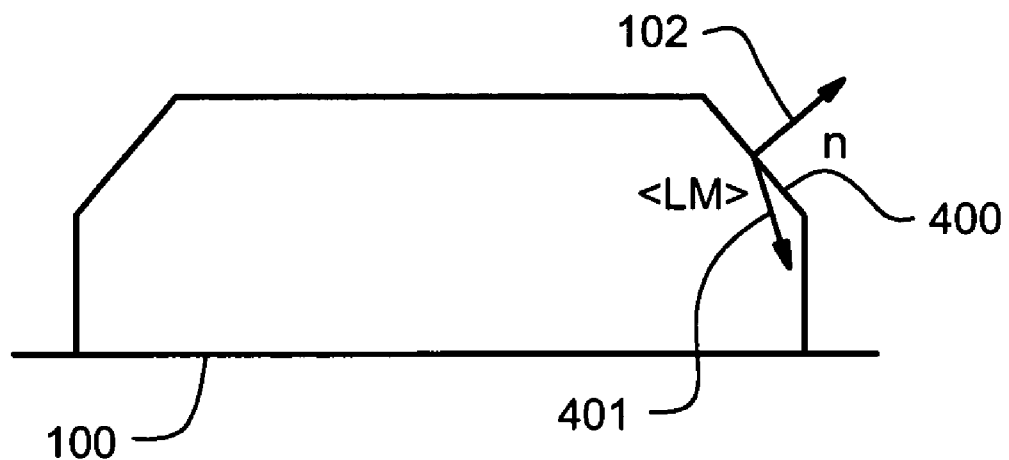
FIG. 4 is a diagram showing one embodiment of a use of light map and normal map data to derive an illumination value.

In order to draw a certain surface, its corresponding light map and normal maps are used, to arrive at optimal illumination data for each cell of the surface. This is shown in FIG. 4. While FIG. 4 is a side view of the tile 100, it should be understood that the actual graphical representation of the tile 100 may be from any view, and will probably be from a more frontal view.

As discussed above, tile 100 has normal map 101 associated with it. It is assumed that tile 100 also coincides with light map area 205. Therefore, the above calculated multidimensional light map value $LM_{205}$ corresponds to it.

It is assumed that one or more of the pixels of tile 100 are to be drawn. While each pixel has a predetermined color, this color should be modified (usually in brightness) to take into account the light illumination of the pixel. This modification is made on the basis of a light illumination value.

The determination of the light illumination value of pixel 400 is examined. The cell to which the pixel belongs is determined. As described above, the cell is the smallest area for which a separate orientation value is available. Of course, it is possible that the pixel is its own cell, in which case this action may be dropped. The orientation value (i.e., normal vector) of the corresponding cell (or pixel, if single pixel cells are used) is retrieved from the normal map 100. This is normal vector 102.

The multidimensional light map value corresponding to the pixel is also retrieved. In this case, there is a single light map value for whole tile 100. However, it is possible, as discussed above, that multiple light map areas span the single tile represented by a single normal area. If this is the case, the position of the pixel may be used to determine the light map area the pixel belongs to, and retrieve the corresponding multidimensional light map value.

The multidimensional light map value represents the intensity and direction of the combined light illumination from all light sources. Thus, it may be represented as vector 401. As discussed above, the illumination of pixel 400 depends on the intensity of the light as well as the angle between the incoming light and the surface orientation. The illumination I may be calculated as follows:

$$I = <LM_{205}> \cdot n,$$

where n is normal vector 102 associated with pixel 400. The illumination is a scalar value and $<LM_{205}>$ is the vector representation of the multidimensional light map value, also referred to as the light map vector. The illumination value I may be used to derive a brightness value for the pixel, or otherwise modify the pixel to indicate its illumination.

There is another method for computing the illumination I. It may be shown by the following formula:

$$I = (n \cdot b_1) lm_1 + (n \cdot b_2) lm_2 + (n \cdot b_3) lm_3$$

Both methods yield substantially the same results. In practice the two methods may have different computational efficiencies.

The illumination values are thus determined for each cell, and therefore each pixel. Thus, the whole tile 100 may be drawn using varying illumination values which underscore its three dimensional shape. Other surfaces are similarly drawn. In certain embodiments not all illumination values are determined because only some of the cells may need to be drawn. Thus, a determination may be made of which cells or pixels need to be drawn, and the corresponding illumination values are obtained.

The resultant light at each cell can be colored. Typically, the color space for the resultant light is based on three colors, e.g., red, green, and blue, or cyan, magenta, and yellow, and the like. A method for computing the illumination and color of the resultant light at each cell can be determined as follows:

$$\text{ResultantLight} = (\max(n \cdot b_1)) lm_1 \text{Color1} + (\max(n \cdot b_2)) lm_2 \text{Color2} + (\max(n \cdot b_3)) lm_3 \text{Color3}$$

Yet another method for computing the illumination and color of the resultant light for the cell can be determined as follows:

$$\text{ResultantLight} = (\max(n \cdot b_1))(\max(n \cdot b_1)) lm_1 \text{Color1} + (\max(n \cdot b_2))(\max(n \cdot b_2)) lm_2 \text{Color2} + (\max(n \cdot b_3))(\max(n \cdot b_3)) lm_3 \text{Color3}$$

Still another method for computing the illumination and color for the resultant light for the cell can be determined as follows:

$$\text{ResultantLight} = (n \cdot b_1)(n \cdot b_1) lm_1 \text{Color1} + (n \cdot b_2)(n \cdot b_2) lm_2 \text{Color2} + (n \cdot b_3)(n \cdot b_3) lm_3 \text{Color3}$$

Additionally, another method for computing the illumination and color of the resultant light for the cell can be determined as follows:

$$\text{ResultantLight} = ((\max(n \cdot b_1)) lm_1 \text{Color1} + (\max(n \cdot b_2)) lm_2 \text{Color2} + (\max(n \cdot b_3)) lm_3 \text{Color3}) / ((\max(n \cdot b_1) + \max(n \cdot b_2) + \max(n \cdot b_3))$$

The above described methods and embodiments are suitable for implementation on currently used graphic adapters. In fact, many of the computations described above need not occur at a computer's main processor but may be performed by existing graphic adapters. However, the invention include advantages that are independent of the particular computing systems on which they are implemented.

Figure 5:
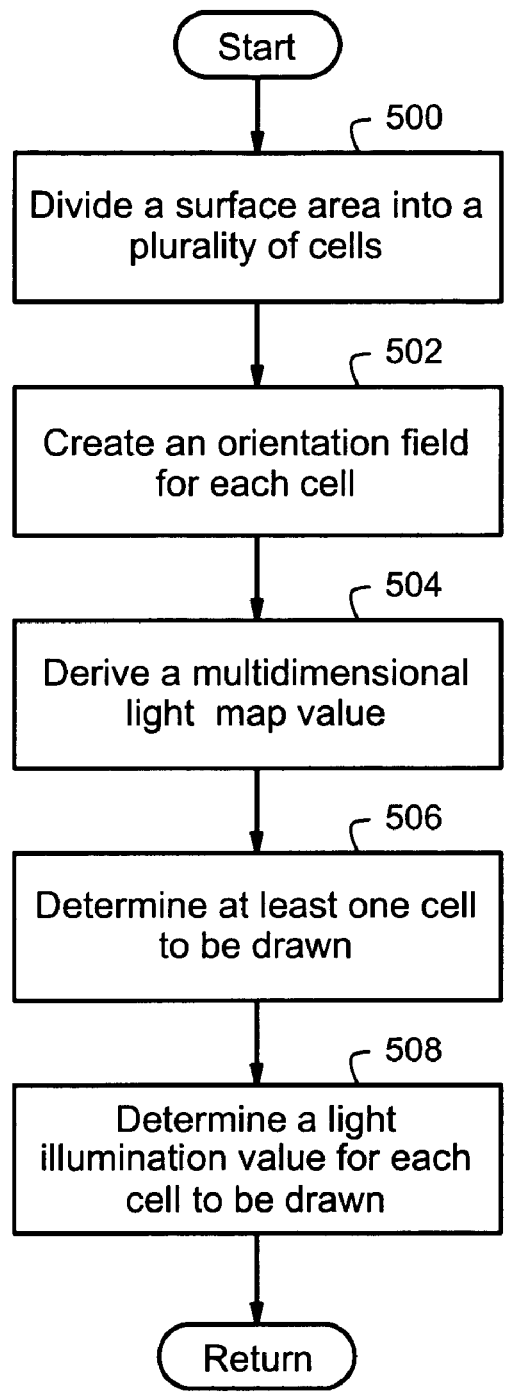
FIG. 5 is a flowchart of one embodiment of a process for determination of a light illumination value.

FIG. 5 is a flow chart of one of the methods for determining an illumination value described above. At block 500, a surface area is divided into a plurality of cells. At block 502, an orientation field is created for each cell. The orientation field defines the orientation of the cell. At block 504, a multidimensional light map value is derived. The light illumination value is based on the sum of the illumination of the surface area contributed by at least one illumination source. At block 506, one or more cells to be drawn are chosen. This determination may be made based on a variety of factors, such as the visibility of the cells. Then, at block 508, a light illumination value for each cell to be drawn is determined. This determination is based on the multidimensional light map value and the orientation field of the cell to be drawn.

Figure 6:
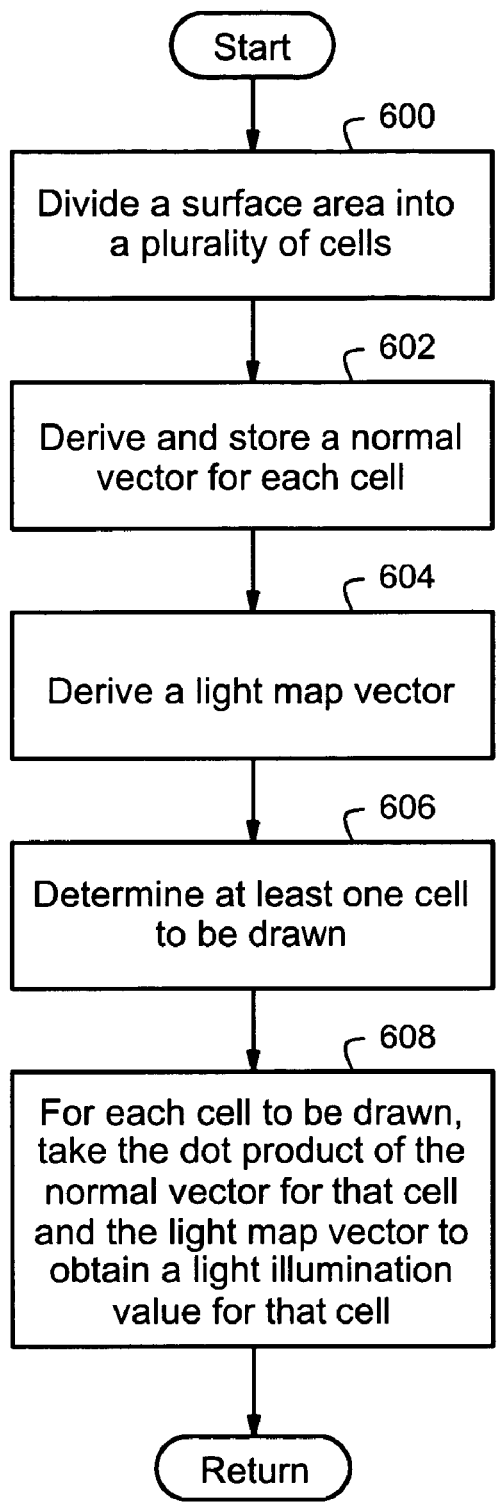
FIG. 6 is a flowchart of one embodiment of an alternative process for determination of a light illumination value.

FIG. 6 is a flow chart of another method for determining an illumination value described above. A surface area is divided into a plurality of cells (block 600). A normal vector is derived and stored for each cell (block 602). A light map vector is derived for the surface area (block 604). The light map vector is related to the sum of the illuminations of the surface area by one or more illumination sources. At block 606, one or more cells to be drawn are chosen. This determination may be made based on a variety of factors, such as the visibility of the cells. Then, at action 608, a light illumination value for each cell to be drawn is determined. This determination is made by obtaining the dot product of the light map vector and the normal vector for the cell to be drawn.

The various embodiments have been described above in light of certain mathematical relationships. A person skilled in the art would note that these mathematical relationships are subject to many possible computer implementations, which are all within the scope of the invention. Furthermore, it should be noted that the language of mathematics allows many ways to convey the same relationship. All such variations of the above described equations and relationships are naturally within the scope of the invention.

Figure 7:
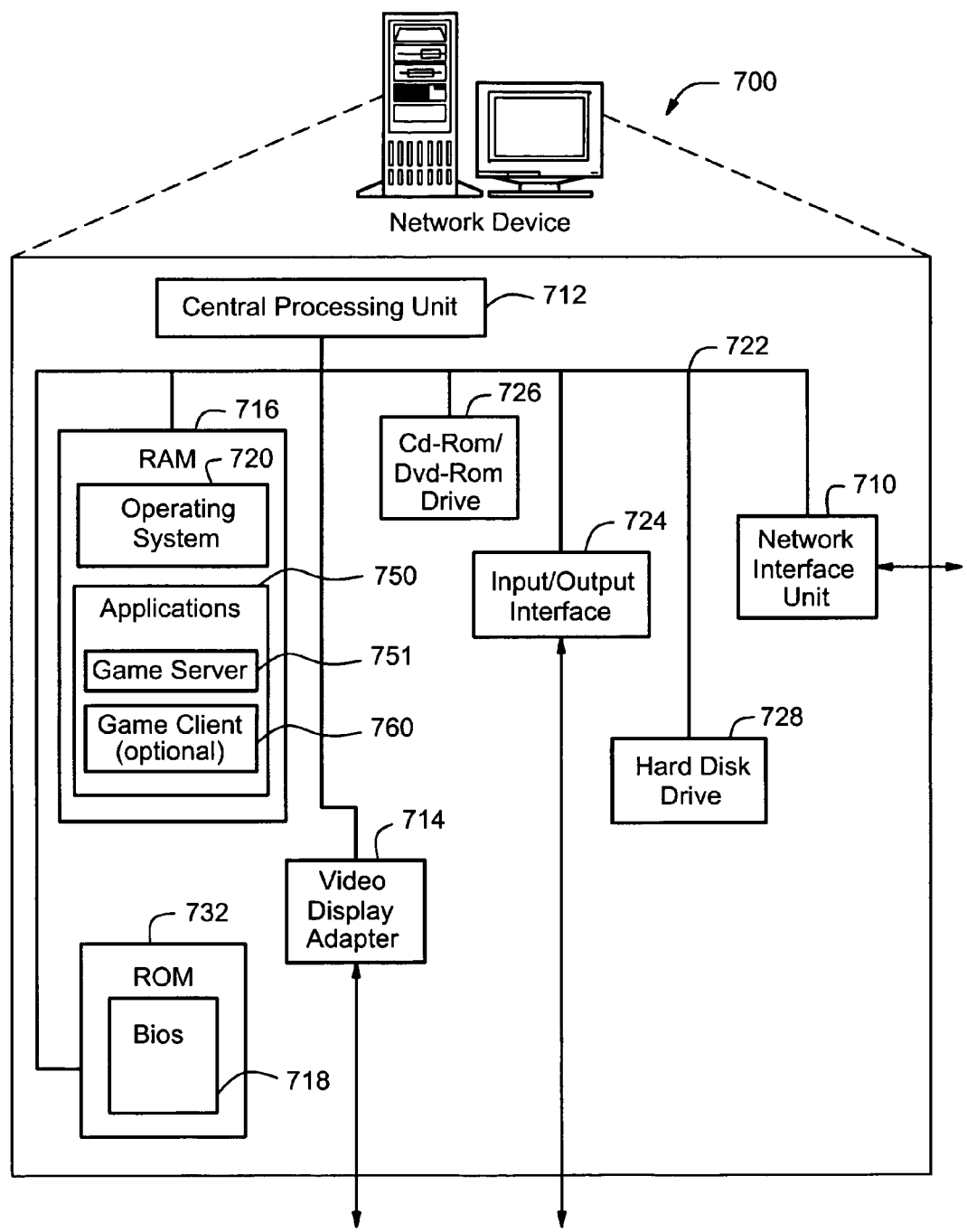
FIG. 7 is a diagram of one embodiment of a computer including a graphics application.

The above described methods may be used in variety of computers, electronic devices, entertainment devices and the like. FIG. 7 shows one embodiment of network device 700, according to one embodiment of the invention. Network device 700 may include many more components than those shown. The components shown, however, are sufficient to disclose an illustrative embodiment for practicing the invention. Network device 700 may represent, for example, server 810 of FIG. 8.

Network device 700 includes processing unit 712, video display adapter 714, and a mass memory, all in communication with each other via bus 722. The mass memory generally includes RAM 716, ROM 732, and one or more permanent mass storage devices, such as hard disk drive 728, tape drive, optical drive, and/or floppy disk drive. The mass memory stores operating system 720 for controlling the operation of network device 700. Any general-purpose operating system may be employed. Basic input/output system ("BIOS") 718 is also provided for controlling the low-level operation of network device 700. As illustrated in FIG. 7, network device 700 also can communicate with the Internet, or some other communications network, such as other network devices shown in FIG. 8, via network interface unit 710, which is constructed for use with various communication protocols including the TCP/IP protocols. For example, in one embodiment, network interface unit 710 may employ a hybrid communication scheme using both TCP and IP multicast with a client device, such as client devices 802, 803 and 804 of FIG. 8. Network interface unit 710 is sometimes known as a transceiver, network interface card (NIC), and the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 750 are loaded into mass memory and run on operating system 710. Examples of application programs may include transcoders, schedulers, graphics programs, database programs, word processing programs, HTTP programs, user interface programs, various security programs, and so forth. Mass storage may further include applications such as game server 751 and optional game client 760.

Figure 8:
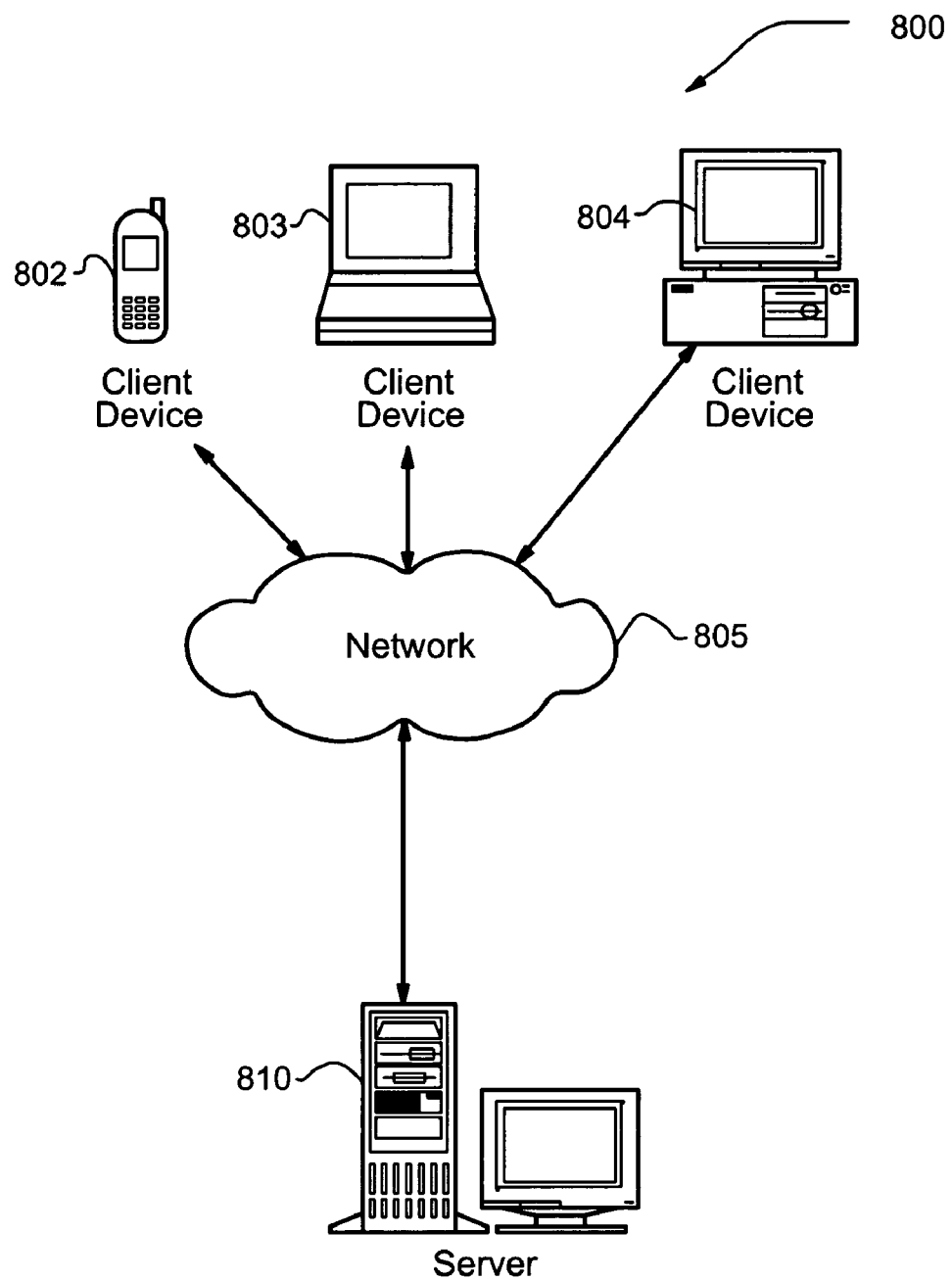
FIG. 8 is a diagram of one embodiment of a networked environment.
Figure 9:
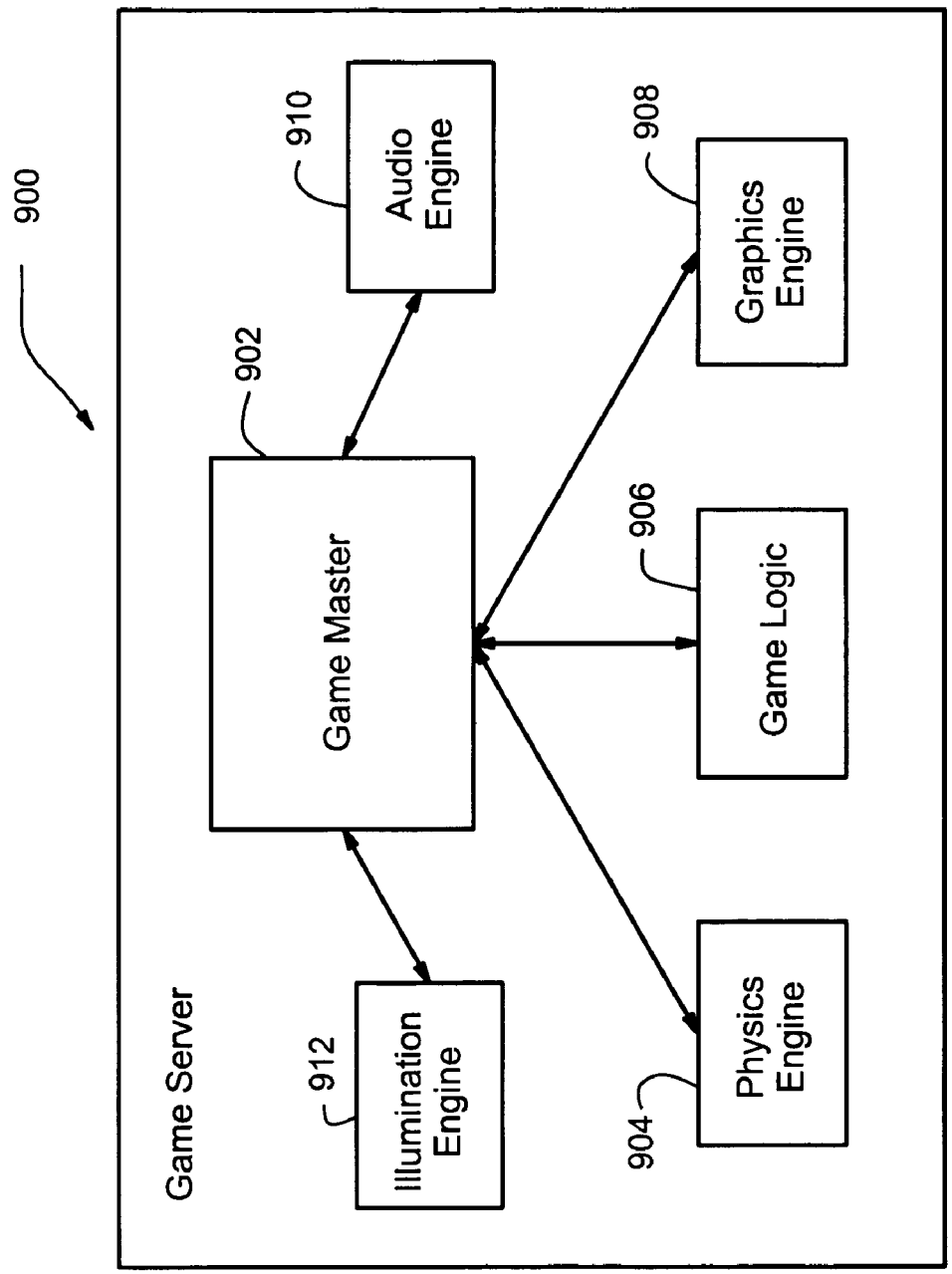
FIG. 9 is a diagram of one embodiment of a game application, in accordance with the present invention.

One embodiment of game server 751 is described in more detail in conjunction with FIG. 9. Briefly, however, game server 751 is configured to enable an end-user to interact with a game, and similar three-dimensional modeling programs for virtual environments. In one embodiment, game server 751 interacts with a game client residing on a client device, such as client devices 802-805 of FIG. 8 and/or optional game client 760 residing on network device 700. Game server 751 may also interact with other components residing on the client device, another network device, and the like. For example, game server 751 may interact with a client application, security application, transport application, and the like, on another device.

Network device 700 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 700 may further include applications that support virtually any secure connection, including but not limited to TLS, TTLS, EAP, SSL, IPSec, and the like.

Network device 700 also includes input/output interface 724 for communicating with external devices, such as a mouse, keyboard, scanner, or other input devices not shown in FIG. 8. Likewise, network device 700 may further include additional mass storage facilities such as CD-ROM/DVD-ROM drive 726 and hard disk drive 728. Hard disk drive 728 may be utilized to store, among other things, application programs, databases, client device information, policy, security information including, but not limited to certificates, ciphers, passwords, and the like.

These features employ a networked environment such as, for example, the one shown in FIG. 8.

FIG. 8 illustrates one embodiment of an environment in which the invention may operate. However, not all components shown in FIG. 8 may be employed to practice the invention, and variations in the arrangement and type of the components may be made without departing from the spirit or scope of the invention.

As shown in the figure, system 800 includes client devices 802-804, network 805, and server 810. Network 805 enables communication between client devices 802-804, and server 810.

Generally, client devices 802-804 may include virtually any computing device capable of connecting to another computing device to send and receive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie-talkies, radio frequency (RF) devices, infrared (IR) devices, CBs, integrated devices combining one or more of the preceding devices, and the like. Alternatively, client devices 802-804 may be any device that is capable of connecting using a wired or wireless communication medium such as a PDA, POCKET PC, wearable computer, and any other device that is equipped to communicate over a wired and/or wireless communication medium.

Client devices 802-804 may be configured as public systems, such as kiosks, home computing devices, personal computing devices, personal mobile computing device, and the like.

Network 805 is configured to couple client devices 802-804, and the like, with server 810. Network 805 is enabled to employ any form of computer readable media for communicating information from one electronic device to another. Also, network 805 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 805 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for mobile devices, such as client device 802 with various degrees of mobility. For example, network 805 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 805 includes any communication method by which information may travel between client devices 802-804, server 810, and the like.

Additionally, network 805 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Server 810 represents a computer device that provides services to various applications residing on client devices 802-804. Specifically, server 810 may provide services related to graphic applications, such as games residing on the client devices. For example, server 810 may distribute graphic applications or updates thereof to the client devices. In addition, server 810 may combine a plurality of graphic applications into a single system by receiving, processing and sending signals from and to client devices 802-804. Thus combined, the graphic applications may form a multi-user environment, or a multi-player game, and the like. Server 810 may be implemented on a variety of computing devices including personal computers, desktop computers, multiprocessor systems, microprocessor-based devices, network PCs, and the like.

FIG. 9 illustrates a function block diagram of one embodiment of game server 900 for use in server 810 of FIG. 8. As such, game server 900 may represent, for example, game server 751 of FIG. 7. Game server 900 may include many more components than those shown. The components shown, however, are sufficient to disclose an illustrative embodiment for practicing the invention. It is further noted that virtually any distribution of functions may be employed across and between a game client and game server. Moreover, the present invention is not limited to any particular architecture, and another may be employed. However, for ease of illustration of the invention, a client/server architecture has been selected for discussion below. Thus, as shown in the figure, game server 900 includes game master 902, physics engine 904, game logic 906, graphics engine 908, audio engine 910, and illumination engine 912.

Game master 902 may also be configured to provide authentication, and communication services with a game client, another game server, and the like. Game master 902 may receive, for example, input events from the game client, such as keys, mouse movements, and the like, and provide the input events to game logic 906, physics engine 904, graphics engine 908, audio engine 910, illumination engine 912, and the like. Game master 902 may further communicate with several game clients to enable multiple players, and the like. Game master 902 may also monitor actions associated with a game client, client device, another game server, and the like, to determine if the action is authorized. Game master 902 may also disable an input from an unauthorized sender.

Game master 902 may further manage interactions between physics engine 904, game logic 906, and graphics engine 908, audio engine 910, and illumination engine 912. For example, in one embodiment, game master 902 may perform substantially similar to the processes described below in conjunction with FIGS. 5 and 6.

Game logic 906 is also in communication with game master 902, and is configured to provide game rules, goals, and the like. Game logic 906 may include a definition of a game logic entity within the game, such as an avatar, vehicle, and the like. Game logic 306 may include rules, goals, and the like, associated with how the game logic entity may move, interact, appear, and the like, as well. Game logic 906 may further include information about the environment, and the like, in which the game logic entity may interact. Game logic 906 may also included a component associated with artificial intelligence, neural networks, and the like.

Physics engine 904 is in communication with game master 902. Physics engine 904 is configured to provide mathematical computations for interactions, movements, forces, torques, collision detections, collisions, and the like. In one embodiment, physics engine 904 is a provided by a third party. However, the invention is not so limited and virtually any physics engine 904 may be employed that is configured to determine properties of entities, and a relationship between the entities and environments related to the laws of physics as abstracted for a virtual environment.

Physics engine 904 may determine the interactions, movements, forces, torques, collisions, and the like for a physic's proxy. Virtually every game logic entity may have associated with it, a physic's proxy. The physic's proxy may be substantially similar to the game logic entity, including, but not limited to shape. In one embodiment, however, the physic's proxy is reduced in size from the game logic entity by an amount epsilon. The epsilon may be virtually any value, including, but not limited to a value substantially equal to a distance the game logic entity may be able to move during one computational frame.

Graphics engine 908 is in communication with game master 902 and is configured to determine and provide graphical information associated with the overall game. As such, graphics engine 908 may include a bump-mapping component for determining and rending surfaces having high-density surface detail. Graphics engine 908 may also include a polygon component for rendering three-dimensional objects, an ambient light component for rendering ambient light effects, and the like. Graphics engine 908 may further include an animation component, and the like. However, graphics engine 908 is not limited to these components, and others may be included, without departing from the scope or spirit of the invention. For example, additional components may exist that are employable for managing and storing such information, as map files, entity data files, environment data files, color palette files, texture files, and the like.

Audio engine 910 is in communication with game master 902 and is configured to determine and provide audio information associated with the overall game. As such, audio engine 910 may include an authoring component for generating audio files associated with position and distance of objects in a scene of the virtual environment. Audio engine 910 may further include a mixer for blending and cross fading channels of spatial sound data associated with objects and a character interacting in the scene.

Illumination engine 912 is in communication with game master 902 and is configured to determine and provide the illumination in the virtual environment. As such, illumination engine 912 may include an authoring component for generating light sources and colors for illuminating the virtual environment.

In another embodiment, a game client can be employed to assist with or solely perform single or combinatorial actions associated with game server 900, including those actions associated with game master 902, illumination engine 912, audio engine 910, graphics engine 908, game logic 906, and physics engine 904.

Moreover, it will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

While the foregoing description and drawings represent illustrative embodiments of the present invention, it will be understood that various changes and modifications may be made without departing from the spirit and scope of the present invention.

What is claimed as new and desired to be protected by Letters Patent of the United States is:

1. A method for determining light illumination in a graphical environment, comprising:
    dividing, using a processor, a surface area of an object into a plurality of cells, wherein a size of each cell of the surface area is determined in part on both a distance and an angle of illumination within the graphical environment between each light source and each cell for processing efficiency and quality, wherein dividing is selected to be performed during either one of a preprocessing stage before rendering each cell or a real-time stage comprising the rendering of each cell, based on the processing efficiency and quality, and wherein dividing performed during the real-time stage is performed dynamically in response to a change in one of the distance or the angle of illumination;
    for each cell in the plurality of cells, creating an orientation field defining a surface orientation of the cell, wherein the orientation field includes a vector that is normal to the surface of the cell;
    deriving a multi-dimensional light map value which defines a combined illumination of the surface area by at least one light source;
    determining at least one cell to be drawn from the plurality of cells based on illumination of the surface area by at least one light source; and
    for each cell to be drawn, determining a light illumination value of the cell to be drawn based on a dot product between at least one basis of the multi-dimensional light map value and at least one basis of the vector of the orientation field corresponding to the cell to be drawn, wherein determining the light illumination value is selected to be performed at either one of the preprocessing stage or the real-time stage, and wherein determining the light illumination value is further based on a game logic control of the surface area; and
    rendering at least one cell based at least in part on the determined light illumination value of the at least one cell on a display.

2. The method of claim 1, wherein the determining the light illumination value is performed during the real-time stage, and at least one other action is performed during the preprocessing stage.

3. The method of claim 1, wherein the deriving the multi-dimensional light map value further comprises:
    providing a plurality of illumination vectors, each illumination vector corresponding to an intensity and a direction of illumination received by the surface area from a single light source of the plurality of light sources;
    providing three basis directions, which together span a three dimensional space;
    for each combination of a basis direction and an illumination vector in the plurality of illumination vectors, deriving a partial directional illumination value which corresponds to a projected length of the illumination vector onto the basis direction; and
    for each basis direction, creating a light map value corresponding to an aggregate of the partial directional illumination values derived for the basis direction, each light map value being associated with a corresponding basis direction, wherein the light map values created for the three basis directions together represent the multi-dimensional light map value.

4. The method of claim 3, wherein the orientation field of each cell to be drawn stores the vector that is normal to the surface of the cell to be drawn and determining the light illumination value further comprises the following, performed for each cell to be drawn;
    for each basis direction, calculating a dot product of a unit vector in the basis direction and the vector stored in the orientation field;
    for each basis direction, multiplying the dot product calculated for the basis direction by the light map value associated with the basis direction; and
    adding the results of the multiplications performed in the previous action to determine the light illumination value for the cell to be drawn.

5. The method of claim 3, wherein each basis direction is defined by a basis vector and deriving the partial directional illumination value includes calculating a dot product of the basis vector and an illumination vector.

6. The method of claim 1, wherein rendering the at least one cell further comprises:
    selecting one or more pixels associated with the cell to be drawn; and
    sending an electronic signal to a display device, the electronic signal being operative to modify a brightness of the one or more pixels, and the electronic signal being based on the light illumination value for the cell to be drawn.

7. A method for determining light illumination in a graphical environment comprising:
    providing a plurality of light sources;
    providing, using a processor, a surface area of an object having a plurality of pixels arranged in one or more of a plurality of cells, wherein a size of each cell of the surface area is determined in part on both a distance and an angle of illumination within the graphical environment between each light source and each cell for processing efficiency and quality, wherein providing is selected to be performed during either one of a preprocessing stage before rendering at least one pixel or a real-time stage comprising the rendering of at least one pixel, based on the processing efficiency and quality, and wherein providing performed during the real-time stage is performed dynamically in response to a change in one of the distance or the angle of illumination;

for each pixel in the plurality of pixels, creating a normal vector defining an orientation of the pixel;

deriving a multi-dimensional light map value which defines a total illumination of the surface area by the plurality of light sources;

for each pixel in the plurality of pixels, determining the light illumination of the pixel, based on a dot product between at least one basis of the multi-dimensional light map value and at least one basis of the normal vector associated with the pixel, wherein determining the light illumination value is selected to be performed at either one of the preprocessing stage or the real-time stage, and wherein determining the light illumination is further based on a game logic control of the surface area; and rendering at least one pixel based at least in part on the determined light illumination of the at least one pixel on a display.

8. The method of claim 7, wherein determining the light illumination value is performed during the real-time stage and at least one other action is performed during the preprocessing stage.

9. The method of claim 7, wherein the deriving the multi-dimensional light map value further comprises:

providing a plurality of illumination vectors, each illumination vector in the plurality of illumination vectors corresponding to an intensity and a direction of illumination received by the surface area from a single light source of the plurality of light sources;

providing three basis vectors;

for each combination of basis vector and illumination vector in the plurality of illumination vectors, taking a dot product of the basis vector and the illumination; and for each basis vector, adding the dot products to create a light map value, wherein the light map values created for the three basis vectors together represent the multi-dimensional light map value.

10. A method for determining a light illumination in a graphical environment, comprising:

providing one or more light sources;

creating one or more illumination vectors, each representing an intensity and direction of light emitted from a light source in the one or more light sources;

providing, using a processor, a surface area of an object having a plurality of cells, wherein a size of each cell of the surface area is determined in part on both a distance and an angle of illumination within the graphical environment between each light source and each cell for processing efficiency and quality, wherein providing is selected to be performed during either one of a preprocessing stage before drawing each cell or a real-time stage comprising the drawing of each cell, based on the processing efficiency and quality, and wherein providing performed during the real-time stage is performed dynamically in response to a change in one of the distance or the angle of illumination;

for each cell in the plurality of cells, creating a normal vector defining an orientation of the cell;

deriving a light map vector by adding the one or more illumination vectors;

for each cell, determining the light illumination of the cell, by taking a dot product of the light map vector and the normal vector created for the cell, wherein determining the light illumination value is selected to be performed at either one of the preprocessing stage or the real-time stage, and wherein determining the light illumination is further based on a game logic control of the surface area;

drawing at least one cell based at least in part on the determined light illumination of the at least one cell; and rendering the at least one cell as drawn.

11. The method of claim 10, wherein each cell comprises one pixel.

12. A system for creating computer-generated graphics including a computer having a processor and memory, the memory comprising an application configured to:

divide a surface area of an object into a plurality of cells, wherein a size of each cell of the surface area is determined in part on both a distance and an angle of illumination within a graphical environment between each light source and each cell for processing efficiency and quality, wherein dividing is selected to be performed during either one of a preprocessing stage before drawing the each cell or a real-time stage comprising the drawing of each cell, based on the processing efficiency and quality, and wherein dividing performed during the real-time stage is performed dynamically in response to a change in one of the distance or the angle of illumination;

for each cell in the plurality of cells, create an orientation field defining a surface orientation of the cell, wherein the orientation field includes a vector that is normal to the surface of the cell;

derive a multi-dimensional light map value which defines a combined illumination of the surface area by at least one light source;

determine at least one cell to be drawn from the plurality of cells based on illumination of the surface area by the least one light source;

for each cell to be drawn, determine a light illumination value of the cell to be drawn, based on a dot product between at least one basis of the multi-dimensional light map value and at least one basis of the vector of the orientation field corresponding to the cell to be drawn, wherein determining the light illumination value is selected to be performed at either one of the preprocessing stage or the real-time stage, and wherein determining the light illumination value is further based on a game logic control of the surface area;

drawing at least one cell based at least in part on the determined light illumination value of the at least one cell; and rendering the at least one cell as drawn to a display in communication with the computer.

13. The system of claim 12, wherein the system is further configured to:

provide a plurality of illumination vectors, each illumination vector in the plurality of illumination vectors corresponding to an intensity and direction of illumination received by the surface area from a single light source of the plurality of light sources;

provide three basis directions, which together span a three dimensional space;

for each combination of basis direction and illumination vector, derive a partial directional illumination value which corresponds to a projected length of the illumination vector onto the basis direction; and for each basis direction, create a light map value corresponding to an aggregate of the partial directional illumination values derived for the basis direction, each light map value being associated with the corresponding basis direction, wherein the light map values created for the three basis directions together represent the multi-dimensional light map value.

14. The system of claim 13, wherein the orientation field of each cell to be drawn stores the vector which is normal to the surface of the cell to be drawn and the system is further configured to perform the following for each cell to be drawn;
  for each basis direction, calculating a dot product of a unit vector in the basis direction and the vector stored in the orientation field;
  for each basis direction, multiplying the dot product calculated for the basis direction by the light map value associated with the basis direction; and
  adding the results of the multiplications performed in the previous action to determine the light illumination value for the cell to be drawn.

15. The system of claim 14, wherein each basis direction is defined by a basis vector and deriving the partial directional illumination value includes calculating another dot product of a basis vector and an illumination vector.

16. A system for creating computer-generated graphics comprising a computer having a processor and memory, the memory comprising an application configured to:
  provide one or more light sources;
  create one or more illumination vectors, each representing the intensity and direction of light emitted from a light source from the one or more light sources;
  provide a surface area of an object having a plurality of cells, wherein a size of each cell of the surface area is determined in part on both a distance and an angle of illumination between each light source and each cell for processing efficiency and quality, wherein providing is selected to be performed during either one of a preprocessing stage before drawing each cell or a real-time stage comprising the drawing of each cell, based on the processing efficiency and quality, and wherein providing performed during the real-time stage is performed dynamically in response to a change in one of the distance or the angle of illumination;
  for each cell, create a normal vector defining an orientation of the cell;
  derive a light map vector by adding the one or more illumination vectors;
  for each cell, determine the light illumination of the cell, by taking the dot product of the light map vector and the normal vector created for the cell, wherein determining the light illumination value is selected to be performed at either one of the preprocessing stage or the real-time stage, and wherein determining the light illumination is further based on a game logic control of the surface area;
  drawing at least one cell based at least in part on the determined light illumination of the at least one cell; and
  rendering the at least one cell as drawn in a display in communication with the computer.

17. A computer-readable medium that includes instructions, wherein the execution of the instructions provides for creating computer-generated by enabling actions, comprising:
  dividing a surface area of an object into a plurality of cells, wherein a size of each cell of the surface area is determined in part on both a distance and an angle of illumination within a graphical environment between each light source and each cell for processing efficiency and quality, wherein dividing is selected to be performed during either one of a preprocessing stage before drawing each cell or at a real-time stage comprising the drawing of each cell, based on the processing efficiency and quality, and wherein dividing performed during the real-time stage is performed dynamically in response to a change in one of the distance or the angle of illumination;
  for each cell, creating an orientation field defining a surface orientation of the cell, wherein the orientation field includes a vector that is normal to the surface of the cell;
  deriving a multi-dimensional light map value which defines a combined illumination of the surface area by at least one light source;
  determining at least one cell to be drawn from the plurality of cells based on illumination of the surface area by the least one light source;
  for each cell to be drawn, determining a light illumination value of the cell to be drawn based on a dot product between at least one basis of the multi-dimensional light map value and at least one basis of the vector of the orientation field corresponding to the cell to be drawn, wherein determining the light illumination value is selected to be performed at either one of the preprocessing stage or the real-time stage, and wherein determining the light illumination value is further based on a game logic control of the surface area;
  drawing at least one cell based at least in part on the determined light illumination value of the at least one cell; and
  rendering the at least one cell as drawn.

18. The computer-readable medium of claim 17, wherein deriving the multi-dimensional light map value further comprises:
  providing a plurality of illumination vectors, each vector corresponding to an intensity and direction of illumination received by the surface area form a single light source in the plurality of light sources;
  providing three basis directions, which together span a three dimensional space;
  for each combination of a basis direction and an illumination vector, deriving a partial directional illumination value which corresponds to an projected length of the illumination vector onto the basis direction; and
  for each basis direction, creating a light map value corresponding to an aggregate of the partial directional illumination values derived for the basis direction, each light map value being associated with the corresponding basis direction, wherein the light map values created for the three basis directions together represent the multi-dimensional light map value.

19. The computer-readable medium of claim 18, wherein the orientation field of each cell to be drawn stores the vector which is normal to the surface of the cell to be drawn and determining the light illumination value further comprises the following performed for each cell to be drawn:
  for each basis direction, calculating a dot product of a unit vector in the basis direction and the vector stored in the orientation field;
  for each basis direction, multiplying the dot product calculated for the basis direction by the light map value associated with the basis direction; and
  adding the results of the multiplications performed in the previous action to determine a light illumination value for the cell to be drawn.

20. The computer-readable medium of claim 19, wherein each basis direction is defined by a basis vector, and deriving the partial directional illumination value includes calculating another dot product of a basis vector and an illumination vector.

21. A computer-readable medium that includes instructions, wherein the execution of the instructions provides for creating computer-generated graphics by enabling actions, comprising:
  providing one or more light sources;
  creating one or more illumination vectors, each representing an intensity and direction of light emitted from a light source from the one or more light sources;
  providing a surface area of an object having a plurality of cells, wherein a size of each cell of the surface area is determined in part on both a distance and an angle of illumination between each light source and each cell for processing efficiency and quality, wherein creating is selected to be performed during either one of a preprocessing stage before drawing each cell or at a real-time stage comprising the drawing of each cell, based on the processing efficiency and quality, and wherein providing performed during the real-time stage is performed dynamically in response to a change in one of the distance of the angle of illumination;
  for each cell, creating a normal vector defining an orientation of the cell;
  deriving a light map vector by adding the one or more illumination vectors;
  for each cell, determining the light illumination of the cell, by taking a dot product of the light map vector and the normal vector created for the cell, wherein determining the light illumination value is selected to be performed at either one of the preprocessing stage or the real-time stage, and wherein determining the light illumination is further based on a game logic control of the surface area;
  drawing at least one cell based at least in part on the determined light illumination of the cell; and
  rendering the drawn at least one cell as drawn.

22. The method of claim 1, wherein the processing efficiency and quality used to determine the size of the each cell is based in part on a variance in an angle of illumination for the at least one light source between a plurality of points on the surface area.

23. The method of claim 7, wherein the processing efficiency and quality is based in part on a mobility of a position of at least one of the plurality of light sources, wherein dividing is selected to be performed during the real-time stage based on the mobility.

24. A system for generating light illumination in a virtual environment, comprising:
  at least one first network device operable to perform actions comprising:
  dividing a surface area of an object into a plurality of cells during a real-time stage, wherein a size of each cell of the surface area is determined in part on both a distance and an angle of illumination within the virtual environment between each light source and each cell, and wherein the dividing is performed dynamically in response to a change in one of the distance or the angle of illumination;
  deriving a multi-dimensional light map value which defines a combined illumination of the surface area by at least one light source;
  determining at least one cell to be drawn from the plurality of cells based on illumination of the surface area by the at least one light source; and
  a second network device in communication with the at least one first network device over a network, wherein the second network device is operable to perform actions comprising:
    for each cell to be drawn, determining a light illumination value of the cell to be drawn during the real time stage, based on the multi-dimensional light map value and an orientation field corresponding to the cell to be drawn, wherein the orientation field includes a vector that is normal to the surface of the cell to be drawn, and wherein the multi-dimensional light map value is further based, at least in part, on a dot product between at least one basis of the multi-dimensional light map value and at least one basis of the vector that is normal to the surface of the cell to be drawn; and
    rendering on a display, at least one cell based at least in part on the determined light illumination value.

25. The system of claim 24, wherein dividing the surface area of the object into the plurality of cells is performed during the run-time stage and is based in part on a mobility of a position of at least one of the plurality of light sources.

26. The system of claim 24, wherein determining the light illumination value is based on at least one interaction of the object within the virtual environment, wherein the interaction is determined by the at least one first network device based on a logic engine.

27. The system of claim 24, wherein the second network device is further operable to perform actions comprising:
  receiving an input event, wherein determining the light illumination value is further based on the received input event.

28. The system of claim 24, further comprising a third network device in communication with the at least one first network device over the network, wherein determining, on the second network device, the light illumination value is further based on at least another input event from the third network device.

29. The system of claim 24, wherein the at least one first network device is further operable to perform actions comprising:
  receiving the at least one light source from a component contoured to author the at least one light source.

30. A processor-readable storage medium that includes components, wherein the execution of the components provides for creating computer-generated graphics by enabling actions, comprising:
  a first component that divides a surface area of an object into a plurality of cells during a real-time stage, wherein a size of each cell of the surface area is determined in part on both a distance and an angle of illumination within a graphical environment between each light source and each cell, and wherein the dividing is performed dynamically in response to a change in one of the distance or the angle of illumination;
  a second component that creates an orientation field defining a surface orientation for an individual cell in the plurality of cells, wherein the orientation field includes a vector that is normal to the surface of the individual cell;
  a third component that derives a multi-dimensional light map value which defines a combined illumination of the surface area by at least one light source;
  a fourth component that determines a light illumination value of the individual cell based on a dot product between at least one basis of the multi-dimensional light map value and at least one basis of the vector of the orientation field; and
  a fifth component that renders the individual cell.

* * * * *